April 27, 1954 W. H. BACH 2,677,012
APPARATUS AND METHOD FOR RECORDING TELEVISION PROGRAMS
Filed March 23, 1949 3 Sheets-Sheet 1

WALTER H. BACH,
INVENTOR.
BY Robert W. Fulwider
ATTORNEY

WALTER H. BACH,
INVENTOR.

BY Robert O. Fulwider
ATTORNEY

WALTER H. BACH,
INVENTOR.

BY Robert W. Fulwider
ATTORNEY

Patented Apr. 27, 1954

2,677,012

UNITED STATES PATENT OFFICE 2,677,012

APPARATUS AND METHOD FOR RECORDING TELEVISION PROGRAMS

Walter H. Bach, Los Angeles, Calif.

Application March 23, 1949, Serial No. 82,956

6 Claims. (Cl. 178—7.4)

The present invention relates generally to methods and apparatus for producing visual and audible records of television programs. More particularly, the invention relates to such method and apparatus which is particularly adapted to record the images of a television screen itself, such screen receiving its video signal either through a monitor circuit connected into the transmitter circuit, or being incorporated in a television receiver.

Systems for producing such television transcriptions have been produced and used in the past, but to date have had certain inherent disadvantages. Many of these disadvantages arise due to the particular scansion frequencies and patterns employed in present-day television broadcasting.

The almost universal practice in telecasting at the present time is to transmit the video signal at the rate of thirty frames per second, each of said frames consisting in a pair of interlaced "scans" or "fields," as will hereinafter be described in more detail. The frame rate of thirty is selected because of its commensurability with the usual sixty-cycle alternating current electric power frequency. In most European countries, the standard electric power frequency is fifty cycles per second, and accordingly, the frame rate of television apparatus in European countries is twenty-five instead of thirty.

Inasmuch as each of the interlaced scans consumes a time of approximately one-half of the single frame, the scans in the American system occur at the rate of sixty per second. Each individual scan comprises a number of horizontal lines which are spaced vertically by a distance twice that which appears between lines in the final television frame. The individual scans are so placed on the screen that lines of one scan fall between the lines of the other scan, making up a single frame. Due to the persistency of human vision and also the persistency of the cathode-ray screen in the television receiver, the interlaced lines fuse or blend into a single frame picture having closely spaced horizontal lines of twice the number appearing in any individual scan. Actually, while the duration of a single scan will usually be referred to herein as 1/60 of a second, the duration is slightly less than 1/60 of a second by reason of the so-called "blanking" period which elapses between each successive pair of frames in a television video signal. The purpose of the blanking period is to darken the screen momentarily during the return of the cathode-ray spot to its initial position in the upper left-hand corner to start the next scan, and also to transmit certain other synchronizing signals having to do with the synchronizing of successive scans.

The difficulties which arise in attempting to make a permanent record of television programs result from the difference in the scansion rate of standard sound-motion picture apparatus and that of television equipment. The standard frame rate for sound-motion pictures has been established at 24 frames per second. Practically all cameras and projectors are designed to operate at this rate, and although often adjustable, do not provide a range of adjustment sufficiently great to encompass the difference between 24 frames per second and 30 frames per second, as used in television apparatus. In passing, it may be stated that in European countries, 24 frames per second is also the standard rate for motion picture equipment, but the difference in frame rate between 24 and 25 does not produce a noticeable difference in the quality of either a visual or sound record. Accordingly, the difficulty of difference in frame rate is not a serious one in European countries.

One attempted solution to the problem has been to construct a motion picture camera which operates at 30 frames per second, and to synchronize the operation thereof with the frame rate of a television receiver, whereby to reproduce on film one motion picture frame corresponding to each television frame. Such film could, of course, be projected only through a special projector at the rate of 30 frames per second. Such a solution is not adequate for several reasons. First of all, a substantially greater amount of film is required than is necessary for satisfactory motion picture quality, and secondly, such films would not have universal utility because of the requirement of special equipment for projection.

Another and even more serious difficulty arises, however, in the photographing of television screen images which is due to the nature of the production of the television frame picture on the cathode-ray screen which is different from the intermittent exposure of motion picture frames. It will be realized that because of the fact that the television picture is progressively swept onto the screen as the cathode-ray spot progresses downwardly across the face of the screen, a reduction in the length of exposure when photographing the screen results, not in a reduction of intensity of the recorded photographic image, but in deletion of some of the scansion lines. For example, if the shutter of a motion picture camera photographing a television screen is opened exactly at the beginning of a particular television frame, but is closed prior to the end of that frame period, the scansion lines in a lower portion of the photographic image will be omitted. Due to the fact that, as above stated, the standard television frame consists in two successive scans, the photographic image produced by an exposure which is longer than 1/60 of a second but shorter than 1/30 of a second has a stripe of markedly reduced intensity across the lower portion of the picture, the image appearing within such stripe consisting of only the alternate lines of the initial scan.

Accordingly, it will be seen that not only must the frame rate of the motion picture cameras correspond to that of the television frame rate, but the exposure time must be such that during the open period of the shutter, the scansion spot can completely cover the picture area (and no more).

The conventional motion picture camera produces one exposure every 1/24 of a second. Approximately 1/2 the period of time between one frame and the next, is used up, however, in moving the film from one position to the next. Obviously, during the time that the film is being moved, the shutter must be closed to avoid blurring the photographic image.

One compromise solution to the two above problems, i. e., differential frame rate and exposure, is to run the camera at 24 frames per second and make each "open shutter" period 1/30 of a second. It will be seen that such a procedure leaves 1/24 minus 1/30, or 1/120 of a second in which to move the film. This 1/120 of a second "pull-down" period must be shortened even more by reason of the fact that certain finite periods are required for the shutter to close and to open. Such an extremely short pull-down period results in a pronounced tendency for the pull-down claws or sprocket teeth to tear the film, due to the high acceleration stresses that develop. Furthermore, a mechanism in which mechanical parts are rapidly accelerated and decelerated requires extremely precise and expensive design in order to eliminate vibration and noise. Since the type of transcription contemplated in the class of apparatus under discussion is most efficiently done on a single system, i. e., one in which both the picture and sound are simultaneously recorded on the same negative, it is axiomatic that a quiet and substantially vibrationless camera be used.

Another practical reason for avoiding the use of extremely short pull-down periods is that such a procedure requires substantial rebuilding of the camera from the conventional design, and the manufacture of new intermittent movement of dimensions and characteristics differing radically from those in conventional cameras.

Still another difficulty encountered in previous attempts at television transcription lies in the fact that when a camera frame rate of 24 frames per second is employed, each successive exposure of the film begins at a different epoch in the television frame. For example, in the system just discussed, in which the exposure time is 1/30 of a second, and the film rate is 24 frames per second, let it be assumed that the first film exposure commences at a time when the scanning spot is just beginning its downward excursion across the television screen. The first film exposure being 1/30 of a second will, of course, include exactly one television frame, and the scansion spot will have just completed the last scan at the time the shutter closes. The shutter will then remain closed for a period of 1/120 of a second and will hereupon open to begin the exposure of the next successive frame on the film. Thus it will be seen that the second exposure of the film will begin at a time when 1/120 of a second of the television frame then in progress has already elapsed. This, in turn, means that the scanning spot is half-way down the screen in its first scan when the shutter opens. Theoretically, this situation is completely cured by the fact that at the end of the second film exposure the spot will again be half-way down the screen, whereby to fill in the "gap" which resulted from starting the film exposure at a time partway through the television frame.

A perfect matching of the various scan portions which make up each successive photographic image will result, however, only when the exposure time is accurately maintained. If, for example, the exposure time is very slightly less than 1/30 of a second, a distinctly defined area of the resultant photographic image will be underexposed by a factor of 1/2. If such error in the exposure time is recurring, that is, continues throughout the progress of the photography, a very disturbing horizontal bar will be produced in the final film which effect is generally referred to as "shutter bar."

When the pull-down period is made extremely short, as above set forth, the tendency of the shutter is to "bounce," i. e., to lead or lag its normal position. Therefore, the tendency to erratically change the length of exposure time is extremely pronounced.

Bearing in mind the foregoing discussion, it is a major object of the present invention to provide a method for producing a visual and audible record of television programs which method employs conventional motion picture equipment and requires a minimum of modification of such equipment.

It is another object of the invention to provide apparatus for transcribing television programs which is substantially free from vibration, whereby single system sound and picture photography is practical.

Still another object of the present invention is to provide means in a camera of the class described which substantially reduces the effect of "shutter bar" produced by a mismatching of photographic scan portions of television images which make up a single photographic image.

The overall improvement achieved by the use of the method and apparatus of the present invention results from two major factors which mutually contribute to produce the final result.

First, a novel exposure system is employed in which each photographic image is exposed for a period of 1/60 of a second and exposures are made at the rate of 24 per second, thus leaving approximately 1/40 of a second in which to move the film from one position to the next. Obviously, if the "dark" or closed period of the shutter is 1/40 of a second, the conventional pull-down mechanism may be employed since such conventional mechanisms pull the film down in approximately 1/48 of a second.

The second factor which enters into the improved result is a modification of the conventional shutter whereby instead of abruptly terminating the exposure, the end of the exposure is relatively gradual, so that any mis-matching of the scansion portions produces a shutter bar having edges of gradually diminishing intensity rather than the sharply defined shutter bars heretofore encountered. It has been found that shutter bars having a gradually defined boundary are materially less noticeable than those which are sharply defined.

The foregoing and additional objects and advantages of the invention will become apparent from consideration of the following detailed description of the invention, such consideration being given also to the attached drawings, in which.

Figure 1:
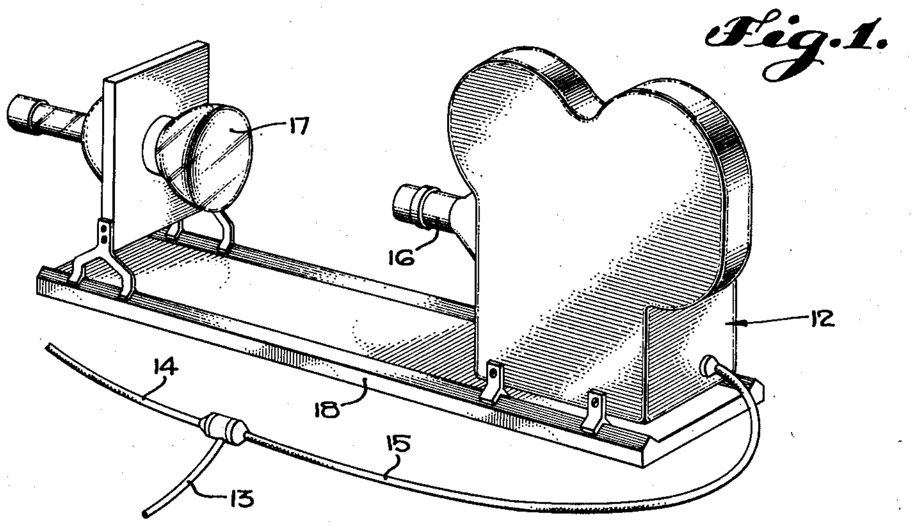
Figure 1 is a perspective view of a camera embodying the present invention, set up to photograph the images of a cathode-ray screen.

Referring now to the drawings, and particularly to Figure 1, it will be seen that I have indicated a motion picture camera of more or less conventional design by the reference character 12. The camera 12 includes a lens 16 focused on the screen 17 of a cathode-ray oscilloscope tube, upon which a television picture is produced. In order to rigidly support the camera 12 and the tube having the screen 17, these elements are mounted on a bed 18 upon which they may be moved longitudinally in order to sharply focus the image appearing on the screen 17. Conventional portions of the television circuit do not form a part of the present invention and are therefore not shown in the drawings.

The camera 12 is electrically driven by a synchronous motor 41 (see Figure 11) and includes sound recording means to produce a sound track on the same film that receives the images of the lens 16. Power to operate the camera 12 and the television circuit are supplied from a lead 13 through branch conductors 14 and 15 to the television circuit and camera, respectively.

Figure 11:
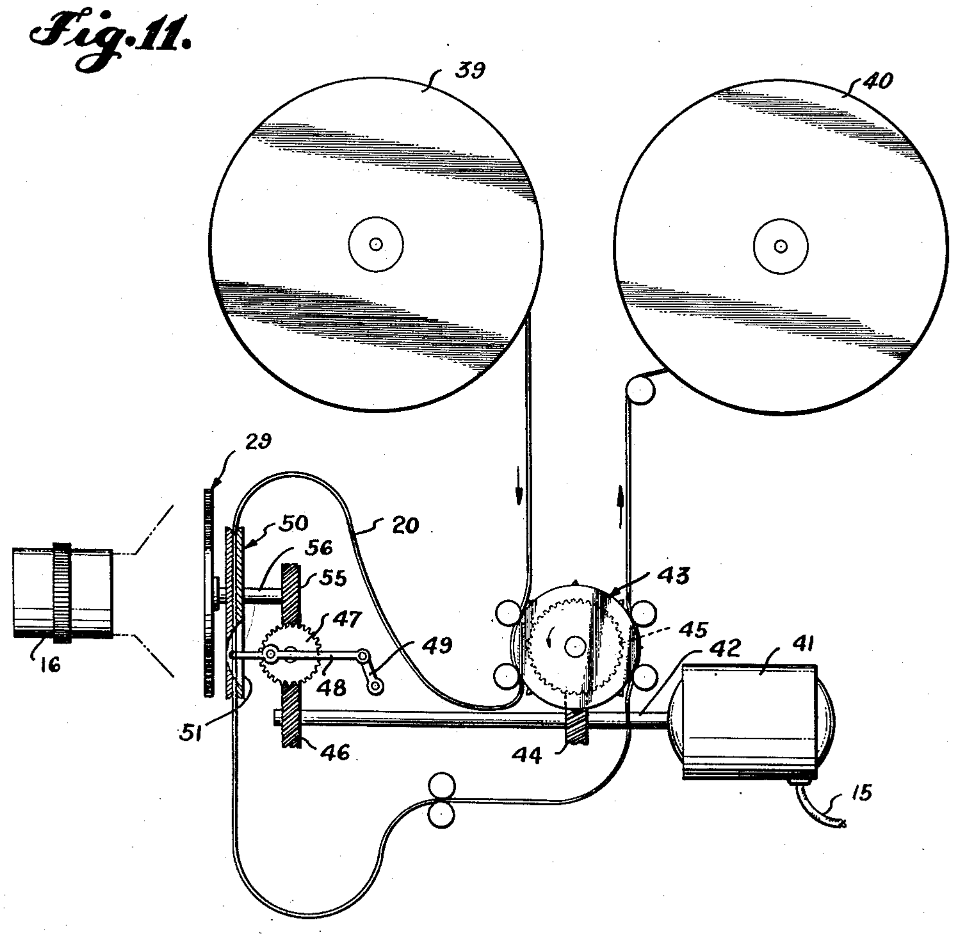
Figure 11 is a semi-schematic side elevational view of the working parts of the film drive and shutter employed in the camera of Figure 1.

The film drive mechanism of the camera 12 is of a known design and is shown schematically in Figure 11. Here it is seen that a shaft extension 42 of the armature shaft of the motor 41 carries helical drive gears 44 and 46 which are meshed with driven gears 45 and 47, respectively, the driven gear 45 being mounted on a common shaft with a film drive sprocket 43 which draws the film 20 from a supply reel 39 and returns it to a take-up reel 40.

A loop of the film 20 passes from the sprocket 43 through a conventional film gate 50 and back to the sprocket 43. Intermittent motion of the film 20 through the gate 50 is effected by a pull-down claw 48 which is crank-connected to a driven gear 47 meshed with the drive gear 46.

Thus it will be seen that, as the shaft 42 is rotated by the motor 41, the film is steadily advanced by the sprocket 43 and intermittently advanced by the claw 48 which is alternately projected into and withdrawn from successive sprocket holes in the film 20. The back end of the claw 48 is movably supported by a link 49 so that the claw is always aligned to enter a sprocket hole when thrust forward by rotation of the gear 47.

A conventional sector shutter 29 is synchronized with the pull-down motion, being mounted on a shaft 56 which carries a gear 55 meshed with the pull-down gear 47. Thus the film is obscured during the time it is being pulled down. It will be noted that the shutter 29 is positioned considerably closer to the film 20 than to the lens 16.

Figure 2:
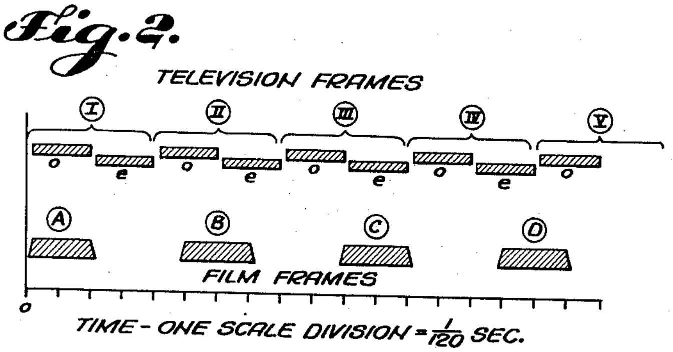
Figure 2 is a graphic representation of the coordination of television frames and film frames, according to the method of the present invention.
Figure 3:
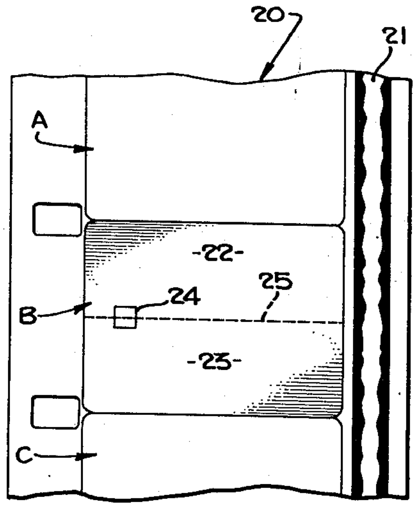
Figure 3 is an enlarged view of a portion of photographic negative produced by the method illustrated in Figure 2.
Figure 4:
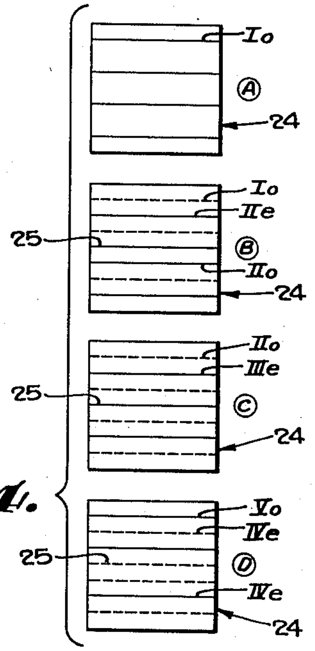
Figure 4 is an enlarged graphic representation of the photographic image appearing on a selected portion of successive frames in the film illustrated in Figure 3.

For a description of the film exposure time and synchronization of the camera 12 with the television images 17, reference should now be had to Figures 2, 3 and 4. In Figure 2, I have graphically illustrated the sequence of occurrences on the television screen 17 and in the camera 12. In the graph, the abscissa represents time, each division being equal to $\frac{1}{120}$ of a second as shown. The particular sequence of events illustrated in Figure 2 is accomplished by a proper selection of the gears 46 and 47 and 55, and a proper proportioning of the pull-down mechanism 48—49. As in most conventional motion picture cameras, the present pull-down time, i. e., the time during which the film is moved by the claw 48, is approximately one-half of the total frame cycle.

In the upper portion of Figure 2, the successive scans appearing on the television screen are indicated by offset horizontal bars, the length of the bar indicating the duration of the scansion period. Pairs of scans which make up a single television frame are bracketed and the successive frames are indicated by Roman numerals. The individual scans that make up each individual frame are further identified by the letters *o* and *e*, representing the odd and even scans.

In the lower portion of Figure 2, the open periods of the shutter in the camera 12 are indicated by horizontal bars, designated A, B, C, etc. The slanting rise and fall at the beginning and end of each bar A, B, C, etc., designates the time taken for the shutter to sweep across the frame. It will be seen that film frame A is coincident with the odd television scan in television frame I, hereinafter designated I*o*; film frame B, occurring $\frac{1}{24}$ of a second later, is coincident in time with half of television scan II*o*, and half of scan II*e*; film frame C is coincident with television scan III*e*; and film frame D is coincident with half of television scan IV*e* and half of scan V*o*; and so forth. Accordingly, it will be seen that alternate odd film frames will be images of an entire television scan while intermediate or alternate even film frames will receive a composite exposure of equivalent time which is made up of the adjoining halves of two successive scans.

While it is possible to electronically reverse the image appearing on the screen 17 and thus produce a direct positive film in one operation, in most instances I prefer to produce a conventional negative film in the camera 12 and to thereafter print a positive or number of positives therefrom.

One incidental advantage to the latter procedure is that during the printing process, there is often an inevitable amount of "creep" or longitudinal displacement of the negative and positive films. This "creep" tends to blur the scan lines slightly whereby to "fill in" the space between lines.

The resulting negative film is illustrated in Figure 3 and designated by the reference character 20. The film includes the successive frames A, B, C, etc., and a sound track 21 recorded in the conventional manner. Alternate even film frames B, D, etc., will be comprised of two adjacent areas 22 and 23, separated by a horizontal juncture line 25. In order to illustrate the nature of the photographic image on the film 20, a small portion 24 thereof lying on the juncture line 25 has been greatly enlarged and illustrated in Figure 4. The enlarged portion 24 in the successive frames illustrated in Figure 4 is taken at the same location in each frame. In frame A at the top of Figure 4, it will be seen that the photographic image is entirely comprised of the scansion lines of scan Io. In the enlarged portion 24 of frame B, illustrated second from the top in Figure 4, it will be seen that the image is composed primarily of scansion lines IIe above the horizontal juncture line 25, and scansion lines IIo below the line 25. Inasmuch as the residual images of the preceding scans remain for the substantial time on the screen 17 due to screen persistence, these lines have been indicated by dotted lines in the successive frame portions in Figure 4. The residual images effect the photographic film to produce an image thereon only slightly fainter than the images "swept on" during the actual film exposure time.

After the film 20 has been exposed in the manner just described, it may be developed in conventional manner, printed and the resultant print projected in a conventional 24-frame-per-second motion picture projector. While an inspection of individual frames in the print produced as just described would show an incomplete or lattice-like picture due to the fact that alternate lines are relatively intense in any particular frame, the projection of the print on a motion picture film permits human persistence of vision to carry over the images of the relatively bright lines on one frame to superimpose them on the relatively dim lines of the next frame, whereby to blend adjacent frames together and fill in a complete picture. Thus, the blending of the adjacent scans which gives the visual effect of a completely solid picture on the television screen, is taken care of in motion picture projection by the persistence of vision between successive frames of the motion picture film.

As previously stated, an erroneous exposure of the film, that is, one which is longer or shorter than 1/60 of a second, will result in the effect known as shutter bar. Shutter bar may be of various types, and may appear at different positions on the frame depending on the phase relationship between the camera and the television scans. If the exposure period is correct, however, no shutter bar will appear regardless of the phase relationship between the television scans and the camera. It is, of course, necessary that the frame rate of both the camera and the television apparatus be accurately maintained. This is almost always the case, however, since both the time determining elements in the television transmitting station and the power line frequency which controls the frame rate of the camera are accurately maintained. As a matter of fact, the primary time determining element of the television transmitting frequency is often the same power line frequency as that existing at the television receiver and employed to run the camera.

Most conventional motion picture cameras employ a sector type rotating shutter which is mechanically coupled to the film driving mechanism so that the "dark" period of the shutter always occurs at the time that the film is being pulled down. In all rotary drives, however, there is an inevitable small amount of backlash which permits the driven member to momentarily overrun the driving member by a small amount, and thus change the synchronous relationship between the two. In ordinary motion picture practice, this is not a serious difficulty, since there is no necessity for extremely accurate shutter timing. Accordingly, in conventional equipment, the shutter often moves slightly ahead of this normal position with respect to the driving member which drives it. This condition, often referred to as "shutter bounce," is considerably aggravated, furthermore, if vibration is present in the drive. Such vibration is produced in cameras which have an extremely fast pull-down rate. Accordingly, it will be seen that the 1/120 of a second pull-down television camera previously described has an inherent difficulty in maintaining an accurately timed shutter opening.

Substantially all of the shutter bounce just described is eliminated in the present case by reason of the fact that the pull-down time may be relatively long, thus making possible a substantial reduction in the amount of vibration present in the camera. In passing, it should be noted that the elimination of such vibration is also essential in single system sound recording cameras of the type shown, since any vibratory motion of the film during the time that sound is being recorded thereon results in a highly undesirable distortion of the reproduced sound.

Even in the present device, however, a small amount of shutter bounce sometimes occurs. Furthermore, the exposure or open shutter period may, in some instances, be slightly in error. For this reason, additional means are provided in the present camera for eliminating the effect of shutter bar which results from erroneous shutter timing.

Figure 5:
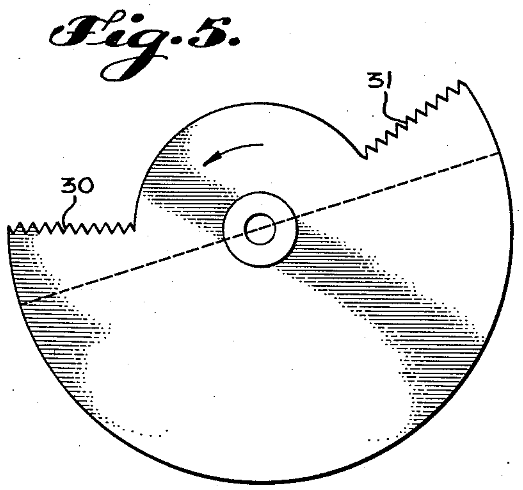
Figure 5 is an elevational view of an improved shutter employed in apparatus embodying the invention.

The shutter 29 of the camera 12 is illustrated in Figure 5, and it will be seen that the opening and closing edges 30 and 31, thereof, are serrate. The result of this arrangement is that when the closing edge of the shutter passes across the image adjacent the film, and when such edge encounters the horizontal scansion lines, instead of instantaneously obliterating the image that reaches the film, such image is gradually diminished in intensity over a relatively short period of time. The effect of this arrangement on "shutter bar" is illustrated in Figures 7, 8 and 9.

Figure 7:
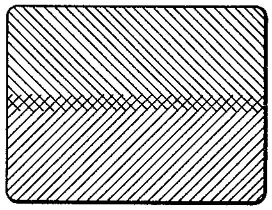
Figures 7 through 9 are graphic representations of a photographic image illustrating the effect of "shutter bar" and the correction thereof.
Figure 8:
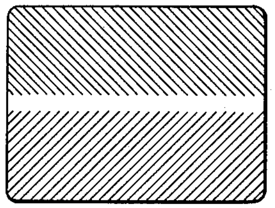
Figure 9:
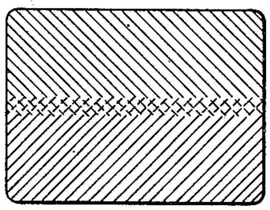

In Figures 7, 8 and 9, the image of one scan is illustrated by diagonal hatching sloping downwardly to the right, while the image of the other scan appearing in any particular frame is illustrated as sloping downwardly to the left. In Figure 7, it will be seen that the exposure period was slightly too long, whereby the two scans therein tend to overlap, thus producing an increased intensity bar across the center of the frame as indicated by the double hatching. In Figure 8, on the other hand, the film exposure period is too short and the two scan areas fail to meet at the horizontal juncture line, and as a result, an unexposed bar appears on the film. In both Figures 7 and 8, the result shown is that which appears when a conventional straight-edged or non-serrate shutter is used.

In Figure 9, the image appearing when a correct exposure of the film is made is illustrated. Here it will be seen that there is a slight overlapping of the two scansion areas, but that the two overlapping portions thereof are of gradually decreasing intensity. Thus, the cumulative intensity at any point within the overlapping area is the same as the intensity anywhere in the frame. If a "short" exposure occurs when using the shutter illustrated in Figure 5, a horizontal band of reduced intensity will occur but the edges of such band will have no sharp definition and will accordingly be much less noticeable in the projected image. Furthermore, all portions of the underexposed band or shutter bar will receive some exposure which further tends to make the bar less noticeable.

Since the shutter in most conventional cameras is not far removed from the film, there is a tendency for the shutter to cast its shadow on the film. This can, of course, be avoided by placing the shutter at or near the optical center of the lens. However, other considerations of design usually dictate placement of the shutter relatively close to the film.

Figure 6:
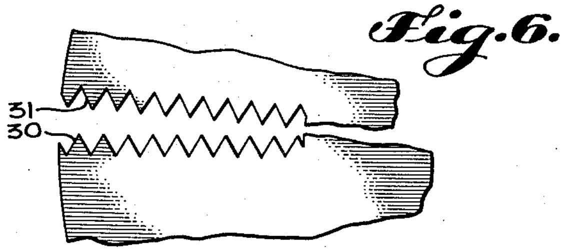
Figure 6 is an enlarged elevational view of portions of the shutter illustrated in Figure 5, showing the comparison of the entering and exiting edges thereof.

In the present instance, this position of the shutter would result in a series of bright spots across the film frames unless the opening and closing edges 30 and 31 of the shutter are exactly complementary. For this reason, the two serrate edges 30 and 31 are made exactly complementary as illustrated in Figure 6. Thus, in film frame exposures where the exposure starts during the progress of a television frame, as for example, film frame B illustrated in Figure 2, the two separate scansion areas IIo and IIe are perfectly matched and any tendency for the shutter edges 30 and 31 to cast their shadow on the film is harmless since such shadows are complementary and result in a completely uniform intensity throughout the frame.

Figure 10:
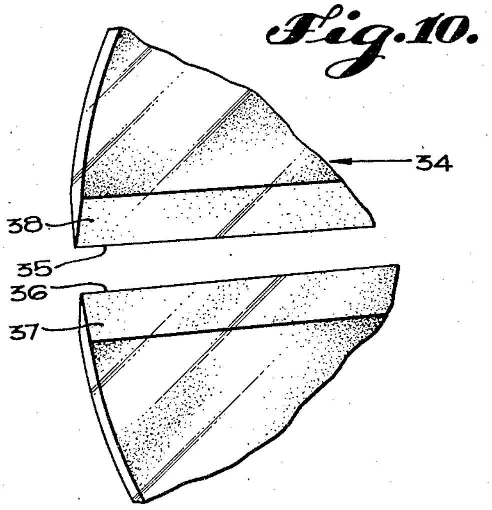
Figure 10 is a partial perspective view of shutter edges similar to Figure 6, but showing a modified form of shutter.

A modified shutter 34, designed to secure a blended entrance and exit edge, is illustrated in Figure 10. The modified shutter 34 is of substantial thickness and is constructed of a material having relatively low light transmission such, e. g., as "smoky glass." The thickness of the body of the shutter is such that it is substantially opaque except adjacent the leading and trailing edges 35 and 36 which are beveled at 37 and 38 to form optical wedges whereby to gradually cut off the light in the same manner as the shutter in Figure 5.

Still another shutter construction which is used to achieve the just-described result is one in which the shutter body is constructed of transparent material and an opaque material is deposited thereon, e. g., a darkened photographic emulsion. The opaque material is graduated in density adjacent the leading and trailing edges so as to produce optical wedges as described in connection with Figure 10.

After exposure according to the above system and employing a shutter of the type described, the quality of the finished print is further improved in the printing process due to the fact that the lattice effect produced by scansion lines on the original television negative is decreased due to slight misregistration above described.

The exposure arrangement and shutter modification above described may be employed with or without subsequent printing procedure, to produce television transcriptions which are materially improved over those heretofore available.

While the apparatus and methods shown and described herein are fully capable of achieving the objects and providing the advantages hereinbefore stated, it will be realized by those skilled in the art that they are capable of considerable modification without departing from the spirit of the invention. For this reason, I do not mean to be limited to the form shown and described herein, but rather to the scope of the appended claims.

I claim:

1. A method of photographing on a light sensitive medium, television programs of the type in which said programs comprise a series of images on a viewing screen occurring $f$ times per second and in which each image is composed of two complementary scans of equal duration of substantially $\frac{1}{2}f$ second, which method includes the steps of: intermittently advancing said light sensitive medium one frame at a time $n$ times per second, where $n$ equals the normal frame projection rate of said light sensitive medium and where $n/2f$ reduced to its lowest terms is a fraction with an odd denominator and a numerator of two, and so advancing said medium at a speed such that the time during which said medium is being advanced and the time during which said medium is stationary are both greater than the time required for any one television scan to thereby minimize acceleration forces acting on said medium; and exposing said medium to said screen image for a period substantially equal to $\frac{1}{2}f$ second each of said times during which said medium is stationary, whereby alternate frames of said medium are exposed to complementary scan patterns, said exposure periods each being defined by the application of light from said image to said medium at the start of said period and the cut-off of said light therefrom at the end of said period; and wherein the exposing of said medium is characterized by effecting said application and cut-off of light gradually over a short but finite period of time.

2. A method of photographing on a light sensitive medium, television programs of the type in which said programs comprise a series of images on a viewing screen occurring $f$ times per second and in which each image is composed of two complementary scans of equal duration of substantially $\frac{1}{2}f$ second, which method includes the steps of: intermittently advancing said light sensitive medium one frame at a time $n$ times per second, where $n$ equals the normal frame projection rate of said light sensitive medium, and where $n/2f$ reduced to its lowest terms is a fraction with an odd denominator and a numerator of two, and so advancing said medium at a speed such that the time during which said medium is being advanced and the time during which said medium is stationary are both greater than the time required for any one television scan to thereby minimize acceleration forces acting on said medium; and exposing said medium to said screen image for a period substantially equal to $\frac{1}{2}f$ second each of said times during which said medium is stationary, whereby alternate frames of said medium are exposed to complementary scan patterns, each of said exposures of said medium being effected by gradually admitting light to said medium, and gradually cutting off said light therefrom at the beginning and end respectively of said exposure period.

3. In an apparatus for recording on motion picture film television programs of the type in which each television picture image is comprised of two scans of equal duration and said images are presented at an image recurrence rate of $f$ images per second, the combination of: means defining an exposure aperture embracing a single frame of said film; film driving means for moving said film past said aperture at an average film frame rate of $n$ frames per second, $n$ being less than $f$; pull-down means coacting with said film driving means to intermittently move said film past said aperture from one frame to the next $n$ times per second during a period of substantially $1/2n$ seconds and at least greater than the duration of each of said scans; optical means for casting on said film in said aperture single reel images of said television picture images; a movable shutter having opaque and transparent portions disposed before said aperture, said shutter including optical wedges in areas adjacent the leading and trailing edges of said transparent portion, whereby said exposure times begin and end with periods of increasing and decreasing intensity respectively; and shutter drive means coacting with said film driving means for moving said shutter in synchronism with said intermittent movement of said film to obscure said film while the same is moving and expose said film to said optical image through said transparent portions while said film is stationary, said opaque and transparent portions of said shutter being proportioned to so expose each frame of said film for an exposure time substantially equal to the duration of each of said scans.

4. In an apparatus for recording on motion picture film television programs of the type in which each television picture image is comprised of two scans of equal duration and said images are presented at an image recurrence rate of $f$ images per second, the combination of: means defining an exposure aperture embracing a single frame of said film; film driving means for moving said film past said aperture at an average film frame rate of $n$ frames per second, $n$ being less than $f$; pull-down means coacting with said film driving means to intermittently move said film past said aperture from one frame to the next $n$ times per second during a period of substantially $1/2n$ seconds and at least greater than the duration of each of said scans; optical means for casting on said film in said aperture single real images of said television picture images; a movable shutter having opaque and transparent portions disposed before said aperture, said transparent portion of said shutter being defined by leading and trailing edge areas of gradually increasing and diminishing light transmission respectively, whereby said exposure times begin and end with periods of increasing and decreasing intensity respectively; and shutter drive means coacting with said film driving means for moving said shutter in synchronism with said intermittent movement of said film to obscure said film while the same is moving and expose said film to said optical image through said transparent portions while said film is stationary, said opaque and transparent portions of said shutter being proportioned to so expose each frame of said film for an exposure time substantially equal to the duration of each of said scans.

5. The construction of claim 4 further characterized in that said edge areas are serrate and of substantially identical pitch, and the crests of the teeth of said serrations in one area are positioned to move across the film along paths intermediate such paths of such crests in the other area.

6. The construction of claim 4 further characterized in that said shutter comprises a transparent member with a deposit of opaque material thereon in said opaque portion, said opaque material being of gradually decreasing and increasing opacity in said edge areas.

References Cited in the file of this patent

UNITED STATES PATENTS

| Number | Name | Date |
|---|---|---|
| 904,212 | Moran | Nov. 17, 1908 |
| 1,270,612 | Green | June 25, 1918 |
| 1,847,642 | Dina | Mar. 1, 1932 |
| 2,251,786 | Epstein | Aug. 5, 1941 |
| 2,329,624 | Kellogg | Sept. 14, 1943 |
| 2,398,642 | Homrighous | Apr. 16, 1946 |
| 2,404,839 | Hammond | July 30, 1946 |
| 2,414,319 | Milholand | Jan. 14, 1947 |